March 27, 1928.  1,663,822
W. G. WALKER
FRUIT JAR OR CONTAINER
Filed Aug. 26, 1925
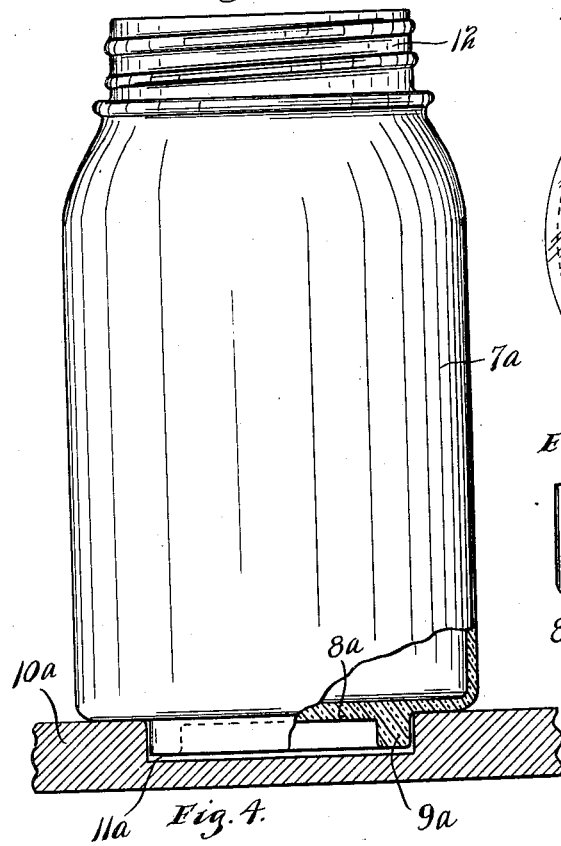
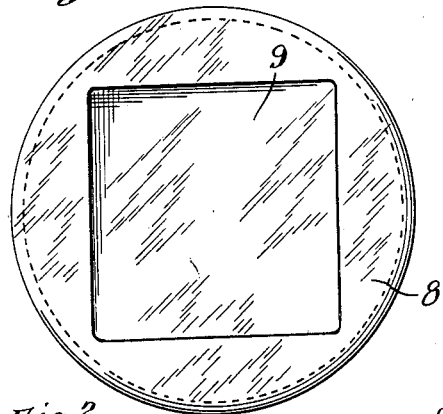
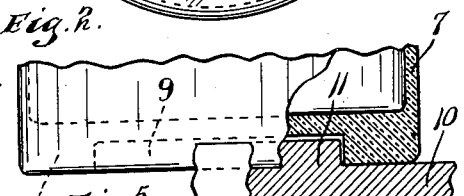
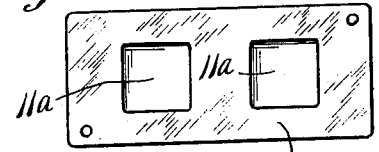
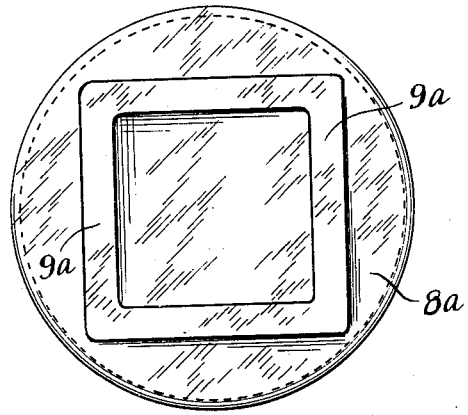
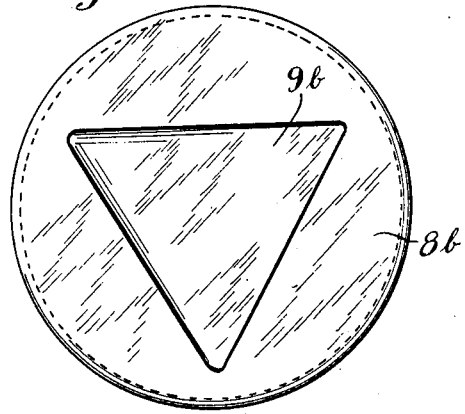
INVENTOR.
WILLIAM G. WALKER.
BY HIS ATTORNEYS.

Patented Mar. 27, 1928.

1,663,822

UNITED STATES PATENT OFFICE.

WILLIAM G. WALKER, OF MINNEAPOLIS, MINNESOTA.

FRUIT JAR OR CONTAINER.

Application filed August 26, 1925. Serial No. 52,586.

This invention relates to fruit jars or other receptacles employing a cover secured thereon by a rotary or twisting motion.

It is the main object of the invention to provide an exceedingly simple but highly efficient fruit jar provided with means adapted to co-operate with means on a supporting surface to hold the jar firmly in place when the cover is being put on.

It is a further object of the invention to provide retaining means for fruit jars or other receptacles, which means may be formed in the base portion of the receptacle when the same is being cast or otherwise constructed.

It is a more specific object of the invention to provide a fruit jar or receptacle having polygonal shaped retaining means on the base portion thereof, adapted to inter-lock with co-operating retaining means on a supporting surface to prevent rotation or displacement of the jar when the cover is being screwed on.

These and other objects of the invention will be apparent from the following description made in connection with the accompanying drawings, wherein like characters refer to similar parts throughout the several views, and in which Fig. 1 is a bottom plan view of one form of the invention;

Fig. 2 is a fragmentary elevation of the same engaged by upstanding retaining means on a supporting surface, some portions being shown in section;

Fig. 3 is a side elevation of another form of the invention inter-locked with retaining means on a supporting surface, some parts being shown in section;

Fig. 4 is a bottom plan view of the same;

Fig. 5 is a plan view on a decreased scale of the supporting surface employed by the form of the invention illustrated in Figs. 3 and 4 showing retaining means for two jars; and Fig. 6 is the bottom plan view of another form of the invention.

In the form of the invention illustrated in Figs. 1 and 2, a fruit jar or receptacle is provided having the substantially cylindrical walls 7 and provided with the usual threaded top flange, as shown in Fig. 3, on which the usual cover is adapted to be screwed. The receptacle has a flat base portion 8 provided with a polygonal shaped recess 9 therein, said recess being preferably cast in base portion 8 and extending approximately through one-half the thickness thereof. A supporting surface 10, such as a table top or board, is provided with one or more upstanding polygonal shaped retaining members 11, similar in shape to the recess 9, in base 8 of the receptacle. In Figs. 1 and 2, recesses 9 and 10 are shown as of square shape.

Obviously, the base portion 8 will fit about the upstanding retaining portion 11 of the supporting surface, inter-locking therewith to prevent rotation or displacement of the jar when the cover is being twisted on.

In Figs. 3 and 4, a jar or receptacle is provided, having the usual cylindrical walls 7ª, the threaded annular top flange 12 and the base portion 8ª. A polygonal shaped depending flange 9ª is cast or otherwise formed in base portion 8ª, being illustrated of square shape, adapted to snugly fit in the similarly shaped recess 11ª of supporting surface 10ª. The supporting surface 10ª is illustrated on a decreased scale in Fig. 5, provided with the plurality of square recesses 11ª.

In this form of the invention, as in the form illustrated in Figs. 1 and 2, the retaining means carried by the base of the receptacle is adapted to inter-lock with the polygonal shaped retaining means on the supporting surface to prevent rotation or displacement of the receptacle when the cover is being secured to the top thereof with a rotary motion.

Fig. 6 shows a form of the invention similar to the form illustrated in Figs. 1 and 2 in every respect, with the exception of the shape of the recess in the base portion. This form has a base portion 8ᵇ provided with a triangular shaped recess 9ᵇ and the supporting surface for this form is, of course, provided with triangular shaped projecting retaining means adapted to inter-lock with the base portion 8ᵇ about recess 9ᵇ.

Instead of providing recesses or projecting portions in a supporting surface to engage the several forms of the invention, pegs, nails or lugs may be secured to the supporting surface polygonally arranged to engage the recess or projecting portion of the base members, as the case may be.

From the above description, it will be seen that the applicant has invented an exceedingly simple but efficient fruit jar or container, provided with means for preventing rotation or displacement thereof when the cover is being put on in the usual manner.

It is, of course, a well-known fact that covers of fruit jars must be screwed on tightly to prevent the leakage of air therein, which leakage causes fermentation of the preserves or fruit. Hitherto it has been difficult to hold a jar while the cover was being tightly secured.

The invention has been put to actual usage and has been found highly efficient for the purposes enumerated.

It will of course, be understood that various changes may be made in the form, proportions, details and arrangement of the parts without departing from the scope of the invention.

What is claimed is:

In combination, a receptacle adapted to have a member applied to the top thereof by rotary motion, a polygonal shaped portion projecting downwardly from the bottom of said receptacle and forming therewith a right angle shoulder at its juncture with said bottom and a holder having a polygonal shaped recess formed therein of such shape as to receive the polygonal shaped portion on the bottom of said receptacle, the walls of said holder adjacent said recess forming a right angle shoulder with the upper surface of said holder, whereby as said receptacle is placed so the said projecting portion fits within said recess the bottom surface of said receptacle outwardly from said projecting portion will bear directly on the top surface of said holder to support the receptacle and act as a base of resistance against the bottom of said jar while said projecting portion and said recess will cooperate to hold said receptacle from turning movement.

In testimony whereof I affix my signature.

WILLIAM G. WALKER.